Figure 1:
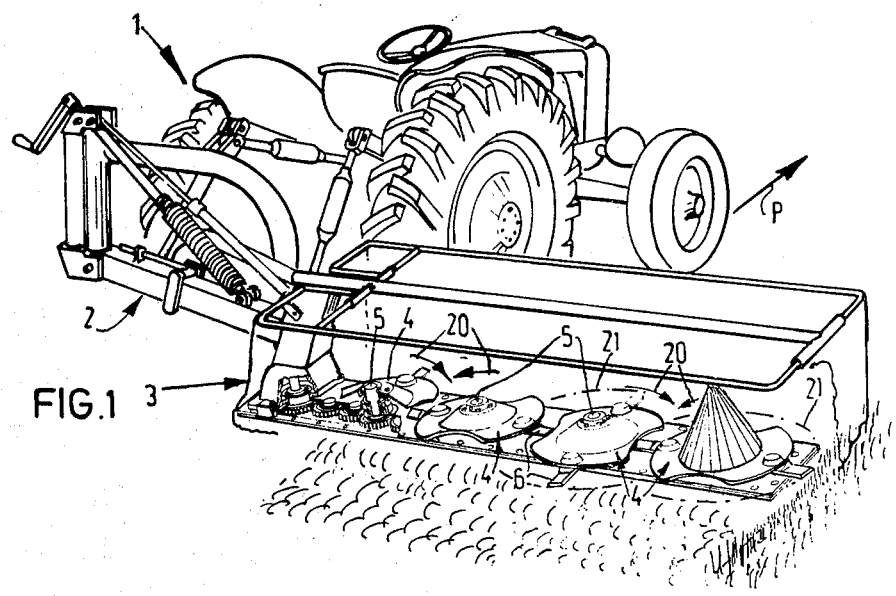

United States Patent [19]

Oosterling et al.

[11] 4,235,069

[45] Nov. 25, 1980

[54] DEVICE FOR MOWING CROP

[75] Inventors: Pieter A. Oosterling; Hendricus C. van Staveren, both of Nieuw-Vennep, Netherlands

[73] Assignee: Multinorm, B.V., Nieuw-Vennep, Netherlands

[21] Appl. No.: 92,265

[22] Filed: Nov. 8, 1979

Related U.S. Application Data

[63] Continuation of Ser. No. 16,365, Mar. 1, 1979, abandoned, Ser. No. 923,254, Jul. 10, 1978, abandoned, Ser. No. 850,352, Nov. 10, 1977, abandoned, and Ser. No. 672,980, Apr. 2, 1976, abandoned.

[30] Foreign Application Priority Data

Apr. 11, 1975 [NL] Netherlands ................ 7504372

[51] Int. Cl.³ .......................................... A01D 35/264
[52] U.S. Cl. ............................................ 56/13.6; 56/295
[58] Field of Search .................... 56/13.6, 6, 192, 295, 56/503

[56] References Cited

FOREIGN PATENT DOCUMENTS 1813610 7/1969 Fed. Rep. of Germany ............ 56/295
1903730 8/1970 Fed. Rep. of Germany ............ 56/295

Primary Examiner—Jay N. Eskovitz
Attorney, Agent, or Firm—John P. Snyder

[57] ABSTRACT

A device for mowing crop comprising a pair of discs adapted to rotate in the cutting plane, driven with equal angular speeds and pairwise in opposite senses and having each outwardly projecting cutters.

A cutter may be bent upwardly due to impact on a stone.

In order to avoid further damage of the device the circumferential rim of each disc is incised in between every two cutters essentially along an arc of a circle having a center of curvature located outside the circumferential rim.

2 Claims, 5 Drawing Figures

DEVICE FOR MOWING CROP

This is a continuation, of application Ser. No. 16,365 of Mar. 1, 1979 now abandoned; rule 60 of Ser. Nos. 923,254 of 7/10/78 now abandoned; 850,352 of 11/10/77, now abandoned and 672,980 of Apr. 2, 1976 now abandoned.

The invention relates to a device for mowing crop comprising a frame extending transversely of the direction of movement and at least one pair of discs adapted to rotate in the cutting plane, driven with equal angular speeds and pairwise in opposite senses and having each two or more outwardly projecting cutters, the cutting circle of the cutters of each disc overlapping the circumferential circle of an adjacent disc.

With a device of the kind set forth it is known to lift the portion of a disc overlapped by a cutter of an adjacent disc during the rotation out of the plane of the disc in order to prevent the cutters from touching the adjacent discs during the rotation out of the discs. During the mowing operation a cutter may be bent upwardly due to impact on a stone; it may continue operating in a deformed state and will then repeatedly butt against the lifted part of the adjacent disc so that not only the adjacent disc and the cutter but particularly the disc driving gear are seriously damaged.

The invention has for its object to avoid such damage of the device. According to the invention the circumferential rim of each disc is incised in between every two cutters essentially along an arc of a circle having a centre of curvature located outside the circumferential rim.

The invention will now be described more fully with reference to the drawing, which shows three embodiments of discs employed in a mowing device.

Figure 2:
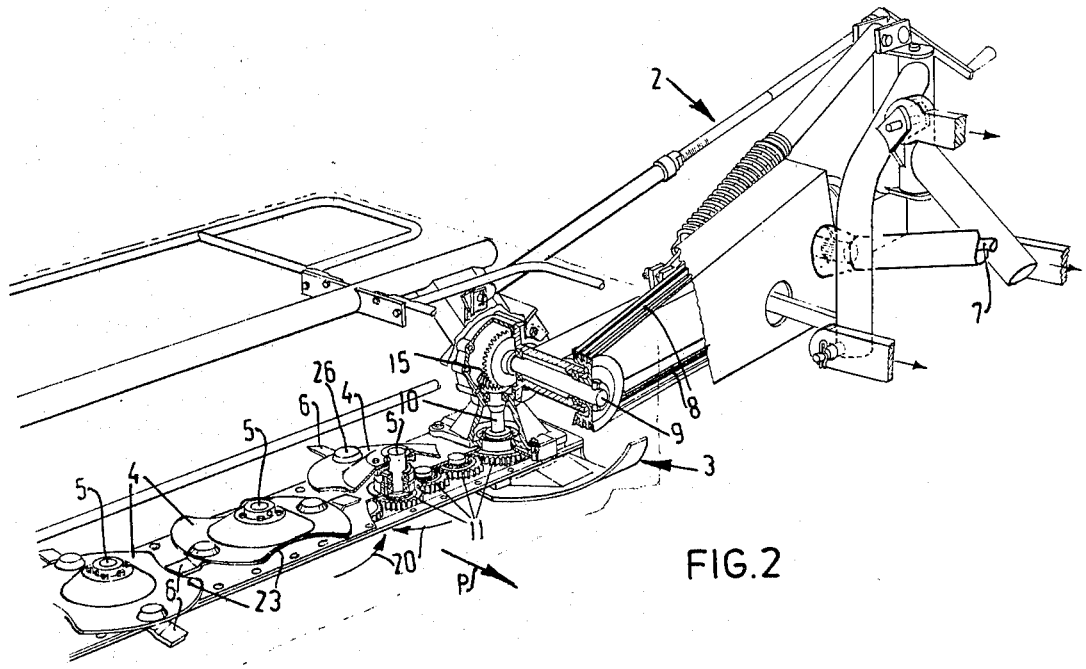

In the drawing:

FIG. 1 is a perspective rear view of a mowing device coupled with an agricultural tractor, FIG. 2 is a perspective front view, partly broken away, of part of the device shown in FIG. 1 and FIGS. 3, 4 and 5 are plan views of three embodiments of discs for use in a mowing device as shown in FIGS. 1 and 2.

The mowing device shown in FIGS. 1 and 2 comprises a supporting structure 2 coupled with the three-point lift of an agricultural tractor 1, a frame 3 being secured to said structure so that it is located at the side of the tractor transversely of the direction of movement P. The supporting structure 2 ensures that the frame 3 is held at the correct height above the ground and at the correct angle to the ground. This can be adjusted by means of a hinge mechanism in the supporting structure 2 not described further here.

The frame 3 holds a row of two pairs of discs 4, extending transversely of the direction of movement P. Each disc 4 is rotatable about a vertical shaft 5 mounted in the supporting structure 3 and at its circumference it is provided with outwardly projecting cutters 6.

The discs 4 are driven as follows. Through the power take-off shaft of the agricultural tractor 1 the driving shaft 7 (FIG. 2) is caused to rotate and hence through a rope transmission 8 an auxiliary shaft 9, which in turn drives the shaft 10 through a right-angled transmission. With the aid of a gear wheel system 11 in the frame 3 the discs 4 are driven with the same speed but in opposite senses, which is indicated by arrows 20 along the circumferential circles 21 of the cutters 6.

Figure 3:
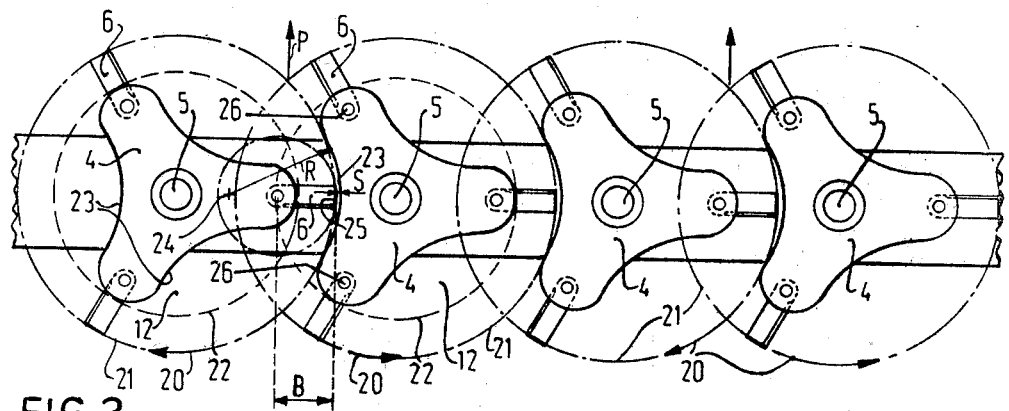
Figure 4:
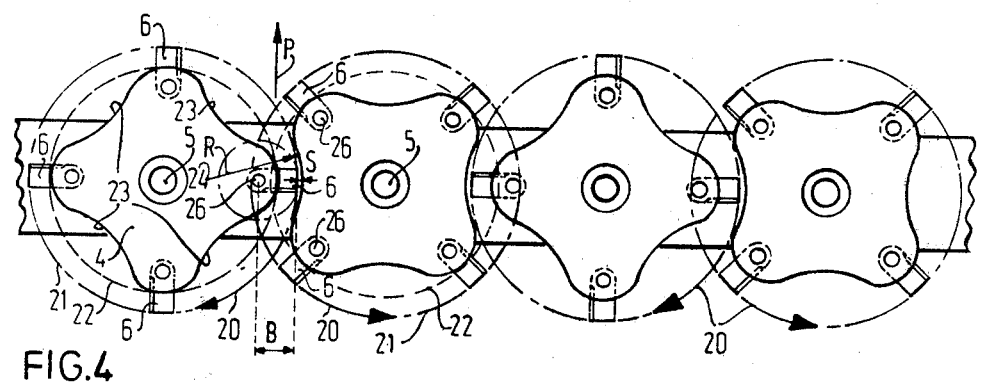
Figure 5:
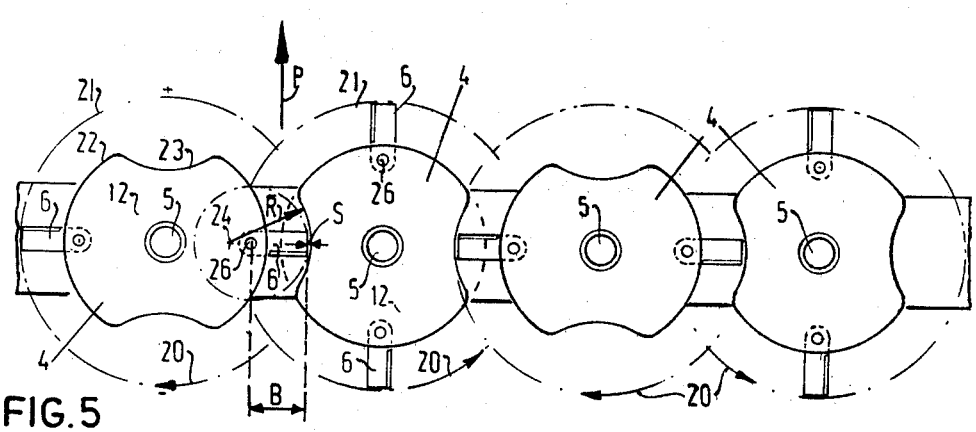

The particular shape of the discs 4 suggested by this invention is shown in detail in FIGS. 3, 4 and 5. The disc 4 may be imagined to form a plate with a circumferential circle 12, whose circumferential rim 22 is incised in between two successive cutters 6 along the arc of a circle 23 having a centre of curvature 24 located outside the circumferential rim 22 and having a radius R, which slightly exceeds the length B of a cutter between the free end 25 and the cutter pivot 26. The recess is so large that any cutter 6 bent upwardly by a stone remains uncovered in all the rotational positions about the cutter hinge 26. Near the circumferential rim 22 of the disc 4, the disc 4 is rounded off at the edge of the arc of a circle 23 near the cutter pivot 26. Apart from this rounding-off and a small amount of clearance S between the end 25 and the arc of a circle 23 it is preferred not to cut out more than is required for leaving the cutter 6 uncovered.

FIG. 3 shows a disc 4 having three cutters 6, FIG. 4 a disc 4 having four cutters 6 and FIG. 5 a disc 4 having two cutters 6. The discs 4 are arranged in a row side by side and relatively turned through an angle so that a cutter 6 of a disc 4 extends in the incision of an adjacent disc. Since the discs 4 are driven with equal angular speeds it is ensured, owing to said starting position that each further cutter 6 enters the next incision.

The shape of the discs 4 in accordance with the invention prevents damage of the device if cutters 6 are bent upwardly, whilst this shape furthermore provides a satisfactory guidance of the cut crop to the rear.

What we claim is:

1. A device for mowing a crop, comprising in combination:

a frame adapted to be attached to a powered vehicle while projecting laterally therefrom, said frame having a series of spaced vertical shafts projecting upwardly therefrom and including means for rotating said shafts so that adjacent pairs thereof rotate in opposition directions;

a disc attached to each shaft in overlying relation to said frame, at least a pair of cutters attached to each disc in uniformly angularly spaced relation therearound and each cutter projecting radially outwardly from its disc whereby the tips of the cutters sweep a circular path which is of larger diameter than the circular path swept by their disc, the spacing between said shafts and the diameter of the paths swept by said discs being such that the paths swept by the tips of the cutters of one disc intersect the path swept by the adjacent disc and such that the paths swept by the tips of the cutters of adjacent discs intersect in forwardly spaced relation to said frame, the cutters of adjacent discs being rotationally staggered such that when a cutter of one disc is positioned in alignment between its shaft and the shaft of an adjacent disc, adjacent cutters of the adjacent disc are positioned symmetrically forwardly and rearwardly thereof, and the periphery of such adjacent disc being cut away between such adjacent cutters along an arc centered on said one disc along a line passing through the center of its shaft and the center of the shaft of the adjacent disc.

2. A device as defined in claim 2 wherein each cutter is pivotally connected to its disc and each cut away of each disc is centered between the shaft and cutter pivot point of an adjacent disc.

* * * * *